United States Patent [19]
Borst

[11] 3,936,350
[45] Feb. 3, 1976

[54] NUCLEAR REACTOR HAVING THERMALLY COMPENSATED SUPPORT STRUCTURE FOR A FUEL ASSEMBLY

[75] Inventor: Ray Borst, Irwin, Pa.
[73] Assignee: Westinghouse Electric Corporation, Pittsburgh, Pa.
[22] Filed: Feb. 7, 1973
[21] Appl. No.: 330,358

Related U.S. Application Data
[63] Continuation of Ser. No. 92,981, Nov. 25, 1970, now Defensive Publication No. T901,027.

[52] U.S. Cl................................ 176/87; 176/78
[51] Int. Cl................................ G21c 3/34
[58] Field of Search .............. 176/87, 40, 76, 78

[56] References Cited
UNITED STATES PATENTS
3,544,425   12/1970   Shaw et al. ........................ 176/87
3,671,394   6/1972   Bernath et al. ..................... 176/87
3,821,079   6/1974   Jabsen ............................... 176/87

*Primary Examiner*—Samuel Feinberg
*Assistant Examiner*—C. T. Jordan
*Attorney, Agent, or Firm*—D. C. Abeles

[57] ABSTRACT

A thermal expansion compensation system for nuclear reactor fuel assemblies is disclosed herein which utilizes materials with different rates of thermal expansion in appropriate components so to: retain alignment of the assembly; reduce or eliminate thermal bow; and reduce or eliminate jump movement of fuel assemblies.

4 Claims, 1 Drawing Figure

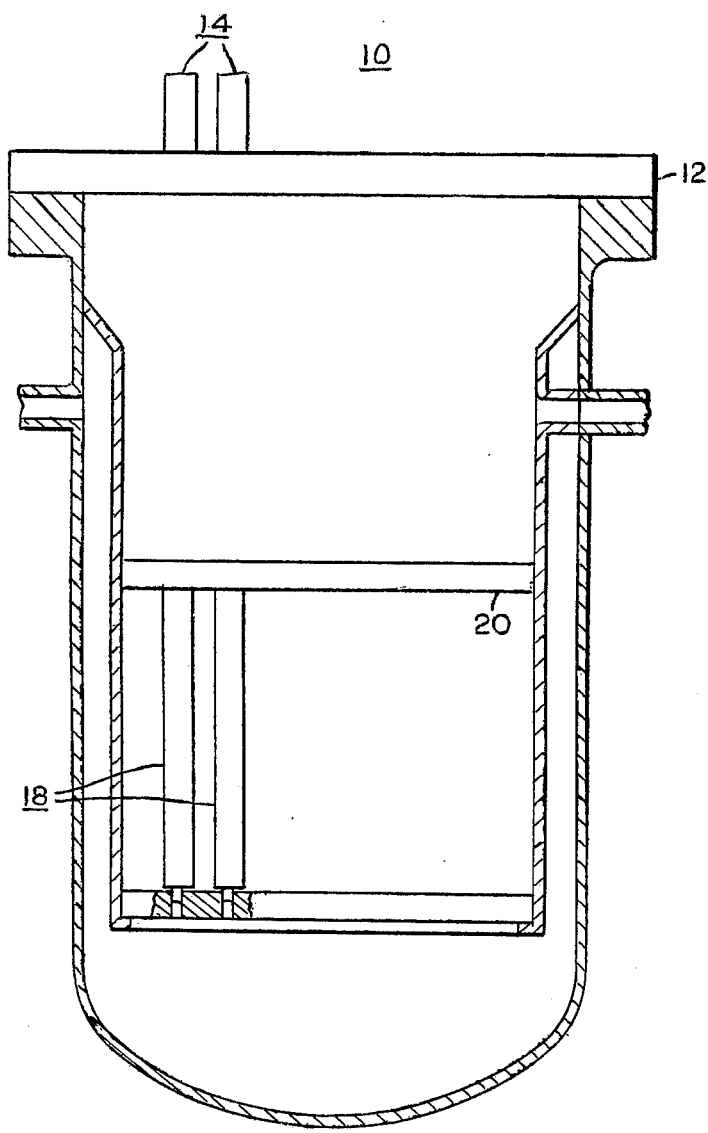

NUCLEAR REACTOR HAVING THERMALLY COMPENSATED SUPPORT STRUCTURE FOR A FUEL ASSEMBLY

This is a continuation, of application Ser. No. 92,981 filed Nov. 25, 1970, now Defensive Publication T901,027 published Aug. 15, 1972 in 901 O. G. 777

BACKGROUND OF THE INVENTION

This invention pertains in general to nuclear reactor fuel assemblies and in particular to a new thermal expansion compensation system for such assemblies.

The number of fuel elements which are used to form the reactive region in a nuclear reactor is ordinarily determined by the critically necessary mass of fissile material and by other considerations, such as the desired energy output and the allowable thermal character of the region. Conventionally, the fuel elements are formed into bundles or sub-assemblies, with the sub-assemblies being assembled or combined to form an overall assembly or reactive region.

The spaced fuel elements located within the same bundle or sub-assembly can experience varying rates of heat generation resulting in differing rises in temperature. Moreover, such factors as flux peaking in adjacent coolant channels, unequal distribution of coolant flow through the core region, presence of adjacent structural material, xenon-tilt and other flux perturbations, also lead to the same effect. Accordingly, the spaced fuel elements respond with correspondingly different thermal expansions or contractions so that, unless means are provided for offsetting this thermal effect, the bundle will be subjected to deformation or bowing, which, in general, is undesirable since "hot spots" or regions of extreme temperature rise in the fuel elements can than result and removability of the fuel bundle is impaired. An additional undesirable effect arises when peripherally located fuel elements bow to jam or obstruct control rod movement.

The aforementioned problems experienced in the boiling water reactors and pressurized water reactors is amplified in the liquid metal fast breeder reactors where the temperature gradients in different parts of the core are even more extreme. The different temperatures expected for the various sections of the liquid metal breeder reactor will cause different thermal expansions among these various sections. Thus, components made of the same material which are aligned at room temperature will not be aligned at operating conditions. For instance, control rods, their drive mechanism and the guide tubes in the reactor core will not remain aligned when the core support plate is exposed to inlet sodium at approximately 750°F, the top of the core assemblies are exposed to outlet sodium at approximately 1000°F and the head, to which the control rod drive mechanism is fastened, is maintained at approximately 400°F. This misalignment causes control rods to bind and not insert when required, thus creating a serious control problem.

The heat generated in the fuel is highest in the center of the core and decreases away from the center. This descrease in heat generation causes a corresponding decrease in the temperature of the fuel, the cladding and the assemblies. Thus a given part of the core will have a higher temperature on the side toward the center than on the outside, causing a temperature gradient through the part. This change in temperature through the part causes uneven thermal expansion with the side closest to the center expanding more, because it is hotter. The uneven thermal expansion causes the part to bend or bow as mentioned above. The thermal bowing in turn causes the fuel sub-assemblies to move toward the center of the core, creating an unstable nuclear characteristic, due to the increased concentration of fissile material, which presents control problems.

The problem becomes extremely critical when the movement of the fuel sub-assembly towards the center of the core occurs in a short period of time. This might occur if a sub-assembly is twisted slightly and pushes against a neighboring sub-assembly. The increasing bowing force will sooner or later overcome the friction between the sub-assemblies, or a random vibration will trigger the movement. Then, the sub-assembly will bend very rapidly towards the center. Even worse, a chain reaction could be caused thereby where several subassemblies jump one after the other. This motion of subassemblies towards the center increases the effective heavy metal mass density with a resultant increase in power, possibly to a dangerous level.

The prior art has been able to minimize the problems caused by the uneven thermal expansion of the various components within the reactor by utilizing different structural support designs in the fuel assembly as illustrated by application No. 19,851 entitled "FUEL ARRANGEMENT FOR A NUCLEAR REACTOR" filed Apr. 4, 1960, now abandoned, and assigned to the Westinghouse Electric Corporation. Another support method was illustrated in application No. 19,760 entitled "MEANS FOR SUPPORTING FUEL ELEMENTS IN A NUCLEAR REACTOR" filed Apr. 4, 1960, now U.S. Pat. No. 3,182,003, and assigned to the Westinghouse Electric Corporation. While the techniques presented in the aforementioned applications for Letters Patent have been able to overcome the problems caused by the thermal gradients in the pressurized water reactor and boiling water reactor, it is not expected that they will be able to solve problems caused by the extreme temperature gradients anticipated in the liquid metal fast breeder reactors.

SUMMARY OF THE INVENTION

This invention utilizes materials with different thermal expansion rates to compensate for the varying temperature gradients encountered in reactor operation.

For example, when a nuclear reactor core had a top plug, bottom support plate and core bundling device, each laterally supporting the fuel rods in the core and when each of these lateral supports is constructed of the same material, a temperature gradient between the supports causes the supports to expand at different rates and thereby to deform the fuel rods. In order to avoid this problem the present invention provides fuel rod and control rod support means which are constructed from materials having such rates of thermal expansion that under the environmental operating conditions at their respective positions of support, the total expansion of each support member substantially equal the thermal expansion of every other support member, under the environmental operating conditions, thus retaining alignment.

BRIEF DESCRIPTION OF THE DRAWING

For a better understanding of the invention, reference may be had to the exemplary embodiment shown in the accompanying drawing which shows a schematic longitudinal sectional view of a nuclear reactor.

DESCRIPTION OF THE PREFERRED EMBODIMENT

This invention utilizes support members formed from preselected materials with different rates of thermal expansion to compensate for the different temperature gradients encountered during reactor operation. The accompanying drawing shows a schematic illustration of a nuclear reactor 10, illustrating the relative positions of various reactor components such as the top plug 12 (top closure with control rod drive mechanisms 14), the core bottom support plate 16, which positions the core fuel assemblies 18 and a coretop hold down plate or core bundling 20. It may be seen from the figure that the aforementioned reactor components provide lateral support to the fuel sub-assembly 18 and control rod drive mechanism 14. However it is to be noted that this invention need not be limited to the specific components shown and described herein, but may be applied to any arrangement of reactor components that experience thermal gradients at reactor operation. Thus, the aforementioned components will be used as an illustration of the principles of this invention and the scope of the invention is not meant to be limited thereby.

The reactor components, such as, the fuel rod and the control rod supports, are constructed out of materials having thermal expansion rates such that the total expansion of each component, under the environmental operating conditions at its respective location, substantially equals the thermal expansion of every other reactor component which functions to provide support in a parallel plane within the reactor, thus balancing the thermal expansions of the various supports to retain alignment.

The balancing of the thermal expansions is achieved as illustrated in the following example. The top plug 12 is to be maintained at, for example, 400°F, the bottom support plate 16 at 750°F and the top "hold down" plate or "core bundling device" 20 at 1000°F. These are the anticipated temperature gradients for the fast breeder reactor. The following equation is then used to calculate the per unit length thermal expansion of each component:

$$E = \alpha (T_2 - T_1);$$

where "E" equals the per unit length thermal expansion of the reactor component;

"$\alpha$" equals a constant called the coefficient of thermal expansion, which is readily obtainable in pre-calculated tables; and "$(T_2 - T_1)$" is the temperature gradient experienced by the reactor component, which is the difference between room temperature or the temperature at which alignment is originally obtained and the operating temperature.

The materials to be used for the individual components may then be determined by first specifying the material to be used in the construction of one of the aforementioned reactor components. This choice is arbitrary and is only limited to a material which will satisfy the components characteristics. Thus, specifying type 304 stainless steel as the material used in the construction of the top plug 12, the coefficient of thermal expansion ($\alpha$) for Type 304 stainless steel is then found to be $10 \times 10^{-6}$ in/in. The temperature gradient as defined above is then (400-70). Substituting these values in the equation we obtain:

$$E = 10 \times 10^{-6}(400-70) = 3300 \times 10^{-6} = 0.0033 \text{ in./in.}$$

Then to balance the thermal expansion of the bottom support plate 16, with the thermal expansion of the top plug 12, we use this value of per unit length thermal expansion and the thermal gradient for the bottom support plate 16, which is (750−70) and substitute it into the equation:

$$E = \alpha (T_2 - T_1) = 0.0033 = \alpha (750-70)$$
$$= \frac{3300 \times 10^{-6}}{680} = 4.86 \times 10^{-6}.$$

Using this coefficient of thermal expansion we then consult the tables of coefficients of thermal expansion and select a material that has an $\alpha$ approximately equal to $4.86 \times 10^{-6}$ and the other desired characteristics necessary for constructing the bottom support plate 16. Such a material is vanadium, which has a coefficient of thermal expansion equal to $5.0 \times 10^{-6}$ in./in.

The same procedure is followed in selecting a material for the top core bundling plate 20:

$$E = \alpha (T_2 - T_1) = 3300 \times 10^{-6} = \alpha (1000 - 70)$$
$$\alpha = \frac{3300 \times 10^{-6}}{930} = 3.55 \times 10^{-6}.$$

Molybdenum is an example of a material which satisfies this criteria with a coefficient of thermal expansion of $3.2 \times 10^{-6}$ in./in.

If the alignment dimensions are based on a heated assembly, for a hot sodium with a temperature of 400°F and a top plug 12 at room temperature, the stainless steel plug 12 expansion will remain $3300 \times 10^{-6}$ in./in. For the bottom support plate 16:

$$\alpha = \frac{3300 \times 10^{-6}}{(750-400)} = 9.45 \times 10^{-6} \text{ in.in.}$$

Therefore Type 304 stainless steel with a coefficient of thermal expansion of $10 \times 10^{-6}$ may also be used for the bottom support plate 16. For the top core bundling plate 20:

$$\alpha = \frac{3300 \times 10^{-6}}{(1000-400)} = 5.5 \times 10^{-6} \text{ in./in.}$$

Therefore Vanadium with a coefficient of thermal expansion of $5.0 \times 10^{-6}$ could be used for the top core bundling plate 20.

In addition to balancing the thermal expansions to retain alignment, the present invention permits the reduction of the gap between fuel sub-assemblies 18, wherein thermal bowing occurs. Some nominal gap is required at reloading temperatures (approximately 400°F) so that the sub-assemblies 18, can be inserted and removed. This gap may be selected to be about 0.030 inches for a fuel sub-assembly 18 about 5 inches wide wherein the structural components of the subassembly are formed from Type 304 stainless steel.

Then of a 0.030 gap exists at 400°F this would be reduced at operating conditions as follows. The change in width of a fuel sub-assembly 18 is:

$$\Delta w = \alpha (T_2 - T_1) W;$$

where "$\Delta W$" is the change in width of the sub-assembly 18;

"$\alpha$" is the coefficient of thermal expansion of the sub-assembly 18;

"$(T_2 - T_1)$" is the thermal gradient, which is the operating temperature of the sub-assembly 18 (i.e., 1000°F), minus the loading temperature (i.e., 400°F); and "$W$" is the width of the sub-assembly 18.

Thus substituting the aforementioned values in the equation we obtain:

$$\Delta W = \alpha (T_2 - T_1) W = 10 \times 10^{-6} (1000-400) 5 = .030 \text{ inches.}$$

The change in the spacings between sub-assemblies 18 is then calculated from the equation:

$$\Delta S = \alpha (T_2 - T_1) S;$$

where "$\Delta S$" is the change in spacing;

"$\alpha$" is the coefficient of thermal expansion of the core bundling device 20 which would effect the change in spacing of the fuel-assemblies 18, (in this example it is assumed, the core bundling device 20 is constructed out of vanadium as calculated above); "$(T_2 - T_1)$" is the thermal quadrant of the core bundling device 20 (1000-400); and "$S$" is the spacing between the centers of the fuel sub-assemblies 18 at loading temperatures (approximately 5 inches).

Substituting these values in the equation we obtain:

$$\Delta S = \alpha (T_2 - T_1) S = 5.0 \times 10^{-6} (750-400) 5 = 0.0084.$$

The gap between fuel sub-assembies 18 at operating conditions is then:

gap = (the gap at loading temperature) $-\Delta W + \Delta S$
gap = 0.030 − 0.030 + 0.0084 = 0.0084 inches.

Thus, the reduction in the gap between fuel sub-assemblies 18 reduces the amount of bow which can develop from 0.030 to 0.0084 inches per sub-assembly 18. If the gap between sub-assemblies 18 is reduced, as shown above, then the "jump movement" problem is also reduced by the same amount.

I claim as my invention:

1. A nuclear reactor, including an upstanding vessel, a reactor core comprising a plurality of assemblies of elongated fuel rods housed within the vessel, and means within the vessel for supporting the fuel rods at a plurality of locations along the longitudinal dimension of the rods for maintaining the rods in a predetermined structural arrangement within the vessel, wherein the support means is constructed to have a measure of thermal expansion under designed reactor operating temperatures at each of the support locations along the rods substantially equal to the thermal expansion of the support means at the other support locations providing support in a parallel plane within the reactor vessel, thus balancing the thermal expansions along parallel planes of support at the plurality of support locations to substantially retain alignment of core components.

2. The reactor of claim 1 wherein said support means comprises a bottom support plate for supporting said core positioned laterally across one end of the fuel rods and a core hold down plate for supporting said core positioned laterally across the other end of the fuel rods, said bottom support plate and core hold down plate providing support for the fuel rods along parallel planes and being supported in position from a wall of the vessel.

3. The nuclear reactor of claim 1 including means for controlling the reactivity of the core wherein the control means is slidably mounted to be movable into and out of the core along an axis parallel with the longitudinal dimension of the rods and is supported in alignment with the rods by the support means.

4. The nuclear reactor of claim 3 having an open ended vessel enclosed by a top plug having penetrations into and through which the control means extend wherein the top plug is constructed to have a measure of thermal expansion in a given plane under designed reactor operating temperatures substantially equal to the thermal expansion of the support means along parallel planes to the given plane along which the support means provide support for the control means.

* * * * *